(12) United States Patent
LaPalme et al.

(10) Patent No.: US 12,703,613 B2
(45) Date of Patent: Aug. 11, 2026

(54) SUPPORT TRAY USED WITH LOAD LIFT FRAME

(71) Applicant: DISH Network L.L.C., Englewood, CO (US)

(72) Inventors: Jerome LaPalme, Aurora, CO (US); William Roberts, Centennial, CO (US); Roy Gonzales, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 269 days.

(21) Appl. No.: 18/391,992

(22) Filed: Dec. 21, 2023

(65) Prior Publication Data

US 2025/0206586 A1 Jun. 26, 2025

(51) Int. Cl.

| | |
|---|---|
| ***B66F 9/06*** | (2006.01) |
| ***B62B 3/04*** | (2006.01) |
| ***B62B 3/10*** | (2006.01) |
| ***B62B 5/06*** | (2006.01) |

(52) U.S. Cl.

CPC .................. *B66F 9/06* (2013.01); *B62B 3/04* (2013.01); *B62B 3/10* (2013.01); *B62B 5/06* (2013.01); *B62B 2202/56* (2013.01); *B62B 2203/10* (2013.01)

(58) Field of Classification Search

CPC ......... B60L 53/80; B62B 3/04; B62B 3/0606; B62B 3/0612; B62B 3/0618; B62B 3/0625; B62B 3/0631; B62B 3/0637; B62B 3/0643; B62B 3/10; B62B 3/108; B62B 5/06; B62B 2202/56; B62B 2203/10; B66F 9/06; G06V 20/64

See application file for complete search history.

(56) References Cited

U.S. PATENT DOCUMENTS

| | | | | |
|---|---|---|---|---|
| 474,653 A * | 5/1892 | Deffler | B66F 9/06 | 187/244 |
| 4,119,044 A * | 10/1978 | Hines | B62B 3/10 | 294/146 |
| 4,759,559 A * | 7/1988 | Moulton | B62B 1/12 | 280/DIG. 6 |
| 5,460,469 A * | 10/1995 | Young | B66F 19/00 | 254/5 C |
| 9,233,699 B2 * | 1/2016 | Murphy | B62B 1/14 | |
| 9,334,663 B2 * | 5/2016 | Galvez | E04F 21/1811 | |
| 12,466,708 B1 * | 11/2025 | Tieman | B66F 3/18 | |
| 2001/0038786 A1 * | 11/2001 | Kim | B62B 1/002 | 414/490 |

(Continued)

*Primary Examiner* — Saul Rodriguez
*Assistant Examiner* — Brendan P Tighe
(74) *Attorney, Agent, or Firm* — Kilpatrick Townsend & Stockton LLP

(57) ABSTRACT

A support tray system includes a load lift frame attached with a plurality of wheels. The support tray system further includes a support tray including a vertical portion having a first edge and a second edge and a horizontal portion extending from the second edge of the vertical portion. The horizontal portion includes a rib for stiffening the horizontal portion, a groove for supporting an article, and a retaining feature opposite the vertical portion. The horizontal portion is removably coupled to a lifting portion of the load lift frame. The support tray system further includes one or more extenders extending between the article and the horizontal portion.

19 Claims, 9 Drawing Sheets

(56) References Cited

U.S. PATENT DOCUMENTS

| | | | | |
|---|---|---|---|---|
| 2009/0047110 | A1* | 2/2009 | Wilkie | B66F 9/06 414/592 |
| 2010/0183412 | A1* | 7/2010 | Borntrager | B66F 9/065 414/541 |
| 2019/0185037 | A1* | 6/2019 | Bryant | B62B 1/12 |
| 2021/0316772 | A1* | 10/2021 | Burton | B66F 9/06 |
| 2021/0339780 | A1* | 11/2021 | Wright | B62B 1/08 |
| 2023/0074140 | A1* | 3/2023 | Aoyama | B66F 7/025 |
| 2023/0076978 | A1* | 3/2023 | Aoyama | B62B 5/0013 |

* cited by examiner

SUPPORT TRAY USED WITH LOAD LIFT FRAME

BACKGROUND OF THE INVENTION

Mounting large articles such as a television, a painting, a picture, a mirror, or the like is often a multi-person task. Mountable articles are often heavy and cumbersome to lift into position and align to a desired location.

BRIEF SUMMARY OF THE INVENTION

According to one embodiment, a support tray system includes a load lift frame attached with a plurality of wheels. The support tray system further includes a support tray including a vertical portion having a first edge and a second edge and a horizontal portion extending from the second edge of the vertical portion. The horizontal portion includes a rib for stiffening the horizontal portion, a groove for supporting an article, and a retaining feature opposite the vertical portion. The horizontal portion is removably coupled to a lifting portion of the load lift frame. The support tray system further includes one or more extenders extending between the article and the horizontal portion.

The support tray system may include various optional embodiments. The load lift frame may include a lifting mechanism to vertically lift and lower the support tray. The support tray system may include one or more handles disposed on the horizontal portion. The support tray system may include each of the one or more extenders having a first end and a second end. The support tray system may include one or more apertures defined by the vertical portion for securing the second end of each of the one or more extenders. The support tray system may include one or more apertures defined by the horizontal portion for securing the support tray to the load lift frame. The support tray system may include a hinge between the vertical portion and the horizontal portion for rotating the vertical portion relative to the horizontal portion.

According to another embodiment, a support tray includes a vertical portion having a first edge and a second edge and a horizontal portion extending from the second edge of the vertical portion. The horizontal portion includes a rib for stiffening the horizontal portion, a groove for supporting an article, and a retaining feature opposite the vertical portion.

The support tray may include various optional embodiments. The article may be a television. The support tray may include one or more handles disposed on the horizontal portion. The support tray may further include one or more extenders, each of the one or more extenders having a first end and a second end. The support tray may include one or more apertures defined by the vertical portion for securing the second end of each of the one or more extenders. The support tray may include one or more apertures defined by the horizontal portion for securing the support tray to a load lift frame. The support tray may include a hinge between the vertical portion and the horizontal portion for rotating the vertical portion relative to the horizontal portion.

According to yet another embodiment, a method for lifting an article includes positioning an article within a groove of a horizontal portion of a support tray coupled to a load lift frame, securing the article to the support tray using one or more extenders extending between a top edge of the article and a vertical portion of the support tray, positioning the load lift frame proximate to a mounting surface, lifting the support tray using the load lift apparatus to a mounting height, and mounting the article to the mounting surface.

The method may include various optional embodiments. The method may include lowering the support tray coupled to the load lift frame. Positioning the load lift frame proximate to a mounting surface and lifting the support tray using the load lift apparatus to a mounting height may include locking the article to the support tray. The support tray may include a hinge between the vertical portion and the horizontal portion of the support tray for rotating the vertical portion relative to the horizontal portion. The method may include folding the support tray by rotating the vertical portion relative to the horizontal portion. The article may be a television.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Several people may work together to mount large articles such as a television, a painting, a picture, a mirror, or the like. These articles may be large and have an uneven weight distribution that makes them difficult to lift into position and align to a desired location. Getting several people together to hang these articles may be time consuming and costly. This problem is most apparent in delivery and mounting services that are often offered with a purchase of a large mountable article. A company that offers these services may need to send more than one person to mount an article, thereby costing the company more money for providing the service. Accordingly, there is a need in the art for a device that enables a single person to mount articles such as the ones described herein.

Various embodiments of the present disclosure provide apparatus, systems, and methods that enables a single person to mount articles that are heavy and/or large such as, but not limited to, a television, a painting, a picture, a mirror, or the like. An apparatus may include a support tray that is removably coupled to a load lift frame. The load lift frame may be a commercially available load lift frame usable with the support tray with minimal modifications. The support tray system described according to embodiments of the present disclosure is portable and a single person may operate the system to mount an article as described herein.

Figure 1:
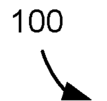
FIG. 1 includes a block diagram of a support tray system, in accordance with embodiments of the present disclosure.
Figure 1:
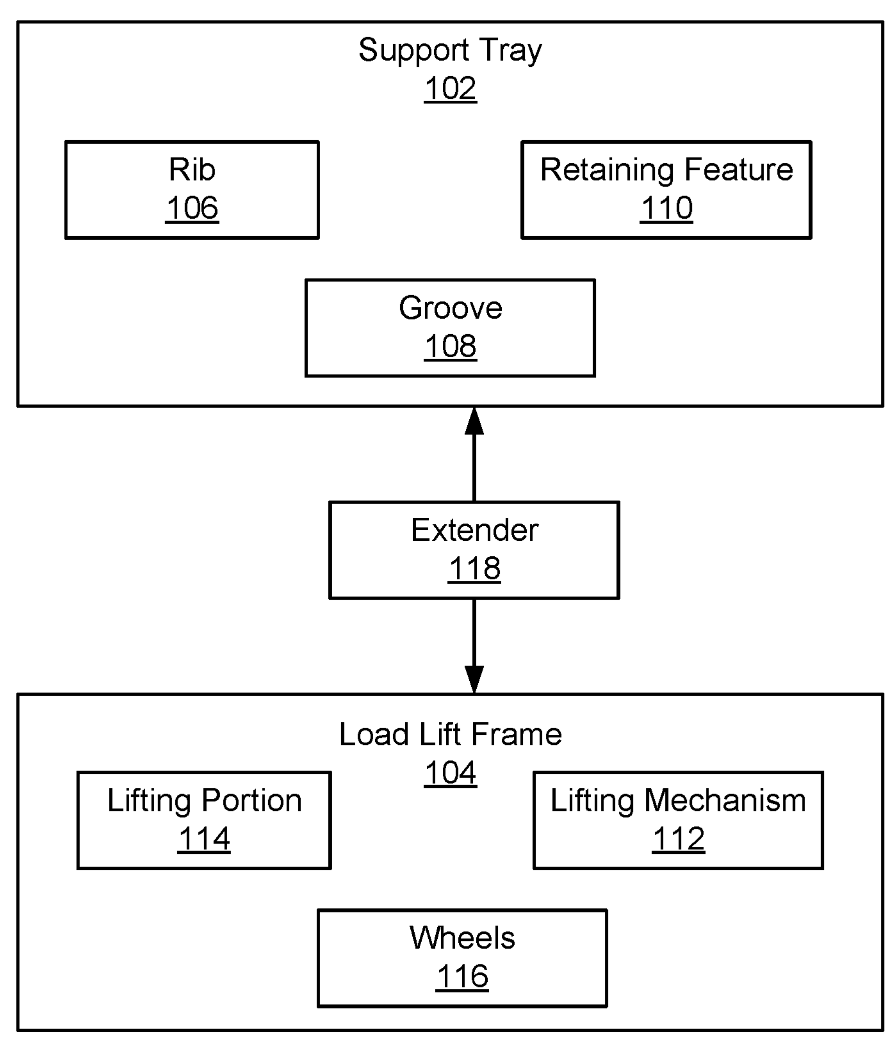

FIG. 1 includes a block diagram of a support tray system. The support tray system 100 may include more or less components than those described herein. The support tray system 100 includes a support tray 102 for use with a load lift frame 104. In particular, the support tray 102 may be removably couplable to the load lift frame 104 using various nuts and bolts, other fastening mechanisms, or the like. In various embodiments, the support tray 102 includes aluminum. In exemplary embodiments, the support tray 102 includes ⅛" thick aluminum.

The support tray 102 includes a rib 106 for supporting a portion of the support tray 102. For example, the additional folding of material to form the rib 106 reinforces the support tray 102 as the support tray 102 supports an article. The support tray 102 further includes a groove 108 for supporting the article. The groove 108 may be slightly wider than the article such that the groove 108 supports an edge of the article therein. For example, a television may have a bottom edge and the groove 108 may be sized and shaped to receive the bottom edge and support the television on the support tray 102. One side of the groove 108 may be defined by a retaining feature 110 such as a lip or the like. The retaining feature 110 retains the article in the groove 108, to be described and shown in detail below.

The system 100 further includes the load lift frame 104. The load lift frame 104 may be any commercially available load lift frame. In exemplary embodiments, the load lift frame 104 is a hand cart apparatus for moving heavy articles. The load lift frame 104 includes a lifting mechanism 112 such as pulleys, hand cranks, an electric lifting mechanism, or the like. In various embodiments, the lifting mechanism 112 lifts a lifting portion 114 vertically along the load lift frame. The lifting portion 114 may be a shelf for placing the article in various embodiments. The support tray 102 is removably coupled to the lifting portion 114. For example, the support tray 102 may be removed from the lifting portion 114 for transportation or storage for reducing the space that the system 100 takes up in a garage, a work truck, or the like. The load lift frame 104 further includes one or more wheels 116 for transporting and positioning the system 100 and any article secured thereon. For example, a single operator may use a handle, such as handle 103 described below, to pull the system 100 toward them and onto one or more wheels 116 for pushing the system 100 into position or pulling the system 100 into position.

According to at least some embodiments, the system 100 further includes one or more extenders 118. In exemplary embodiments, the extenders 118 are telescoping extending members that are adaptable for use with articles of varying sizes, shapes, and dimensions. In at least some embodiments, the extenders 118 each have a first end that couples to and secures the article in position and a second end that couples to and further secures the article to the support tray 102, as described in further details below. An operator may determine how many extenders 118 to use for mounting a particular article based on the size, shape, weight, etc., of the article to be mounted. For example, an operator may use more extenders 118 for a relatively wide article, relative to the support tray 102, compared to other articles.

Figure 2:
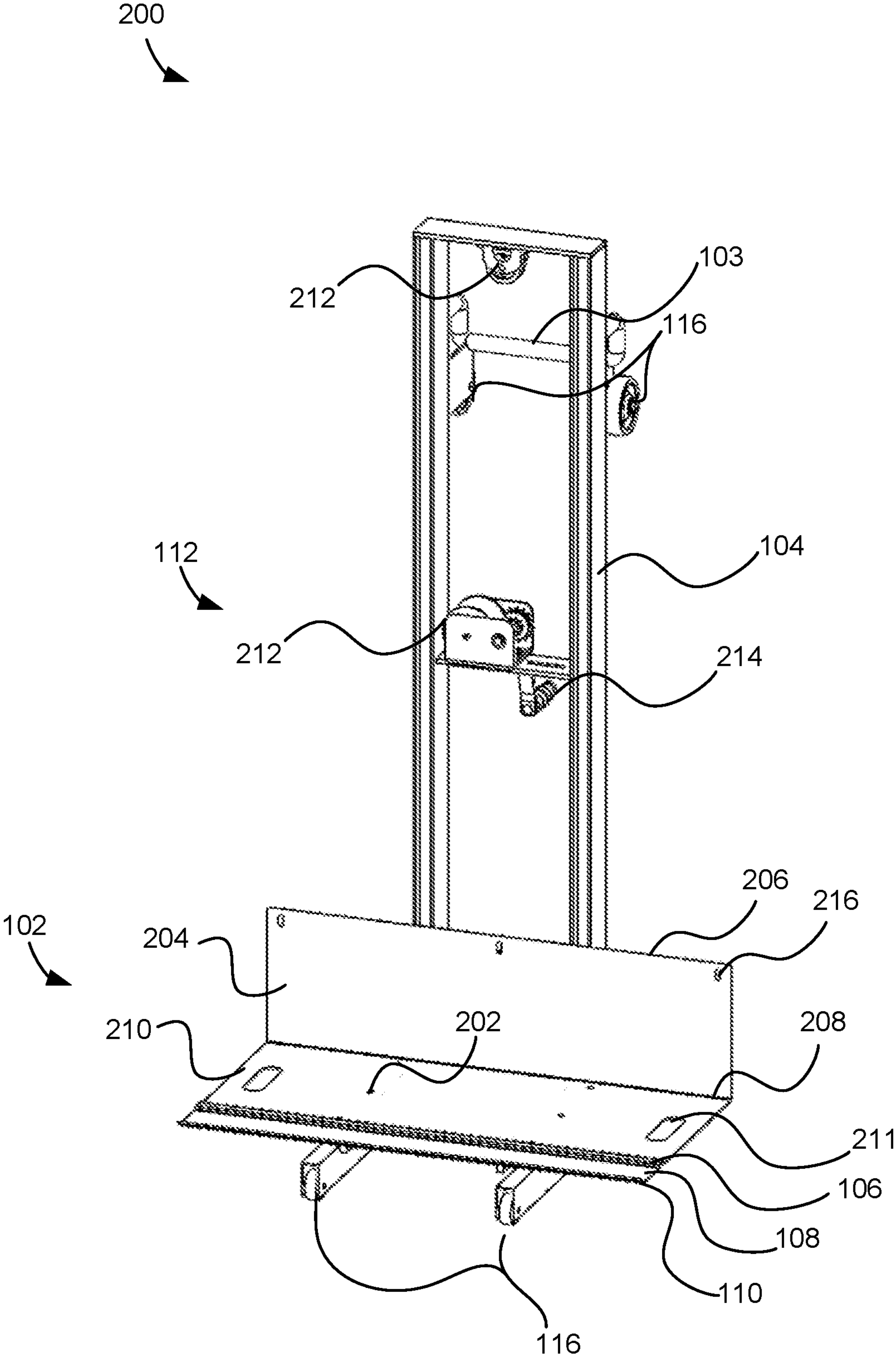
FIG. 2 illustrates a front isometric view of a support tray system including a support tray used with a load lift frame, in accordance with embodiments of the present disclosure.

FIG. 2 illustrates a front isometric view of a support tray system including a support tray used with a load lift frame. The description of the system 100 described with respect to FIG. 1 is relevant to the present description of support tray system 200. Accordingly, similar components are referred to using similar numbering and include similar form and function unless otherwise noted herein. The support tray system 200 includes a support tray 102 and a load lift frame 104. The support tray 102 may be removably couplable to the load lift frame 104 using various nuts and bolts, other fastening mechanisms, or the like, through apertures 202 of the support tray 102 that correspond to apertures (not shown) in the load lift frame 104. In particular, the support tray 102 includes a vertical portion 204 including a first edge 206 and a second edge 208. The support tray 102 further includes a horizontal portion 210 extending from the second edge 208 of the vertical portion 204. The horizontal portion 210 define the apertures 202 for inserting a fastener or the like therethrough to removably couple the support tray 102 to the lifting portion (not shown) of the load lift frame 104. Accordingly, the horizontal portion 210 is removably coupled to a lifting portion of the load lift frame 104.

According to various embodiments, the horizontal portion 210 includes a rib 106 for stiffening the horizontal portion 210. The support tray 102 includes a rib 106 for supporting a portion of the support tray 102. For example, the additional folding of material to form the rib 106 reinforces the support tray 102 as the support tray 102 supports an article. The horizontal portion 210 further includes a groove 108 for supporting an article. The groove 108 may be slightly wider than the article such that the groove 108 supports an edge of the article therein. For example, a television may have a bottom edge and the groove 108 may be sized and shaped to receive the bottom edge and support the television on the support tray 102. One side of the groove 108 may be defined by a retaining feature 110 such as a lip or the like. The retaining feature 110 retains the article in the groove 108. The horizontal portion 210 may further include one or more handles 211 for handling the support tray 102.

In at least some embodiments, the load lift frame 104 may be any commercially available load lift frame. In exemplary embodiments, the load lift frame 104 is a hand cart apparatus for moving heavy articles. The load lift frame 104 includes a lifting mechanism 112 including pulleys 212 and a hand crank 214. In various views, the wiring of the pulleys 212 is removed for clarity. In other embodiments, the lifting mechanism 112 is an electric or hydraulic lifting mechanism using a motor or the like. In various embodiments, the lifting mechanism 112 lifts a lifting portion vertically along the load lift frame 104. The lifting mechanism 112 may be used to lock the support tray 102, such as via a ratcheting mechanism, at a desired height. According to various embodiments of the present disclosure, a single operator can use the system 200 to lift and mount an article.

The load lift frame 104 further includes one or more wheels 116 for transporting and positioning the system 100 and any article secured thereon. In at least some embodiments, the load lift frame 104 wheels 116 may be different sizes. For example, in one exemplary embodiment and as shown in FIG. 2, two relatively larger wheels on the bottom (e.g., closer to the ground when the load lift frame 104 as shown in FIG. 2) are used to pivot the load lift frame 104 and move the load lift frame 104 with or without an article. For example, an operator may pull downward on a handle 103 and the larger wheels are used to lean the system 200 over, thereby adjusting the weight distribution, and move the system 200 to a different destination, as would be appreciated by one having ordinary skill in the art. The two relatively smaller wheels shown in FIG. 2 may be used when the load lift frame 104 is completely pivoted on its side (e.g., perpendicular to the position shown in FIG. 2). Accordingly, the load lift frame 104 may be rolled up a ramp, into a truck, into storage, etc. For example, storing the load lift frame 104 in this position may be more stable than storing the load lift frame 104 in the position shown in FIG. 2. In other embodiments, the relatively smaller wheels are used to transport articles using all four wheels when the load lift frame 104 is on its side.

According to at least some embodiments, the system 200 further includes one or more extenders (such as extenders 118, not shown) having a first end that couples to and secures the article in position and a second end that couples to and further secures the article to the support tray 102. The second end of each of the extenders may be removably coupled to corresponding apertures 216 along the first edge 206 of the vertical portion 204 of the support tray 102. Although three apertures 216 are shown along the first edge 206 of the vertical portion 204, more or less apertures 216 and corresponding extenders may be used as determined by an operator based at least in part on the size and weigh requirements of the system 200.

Figure 3:
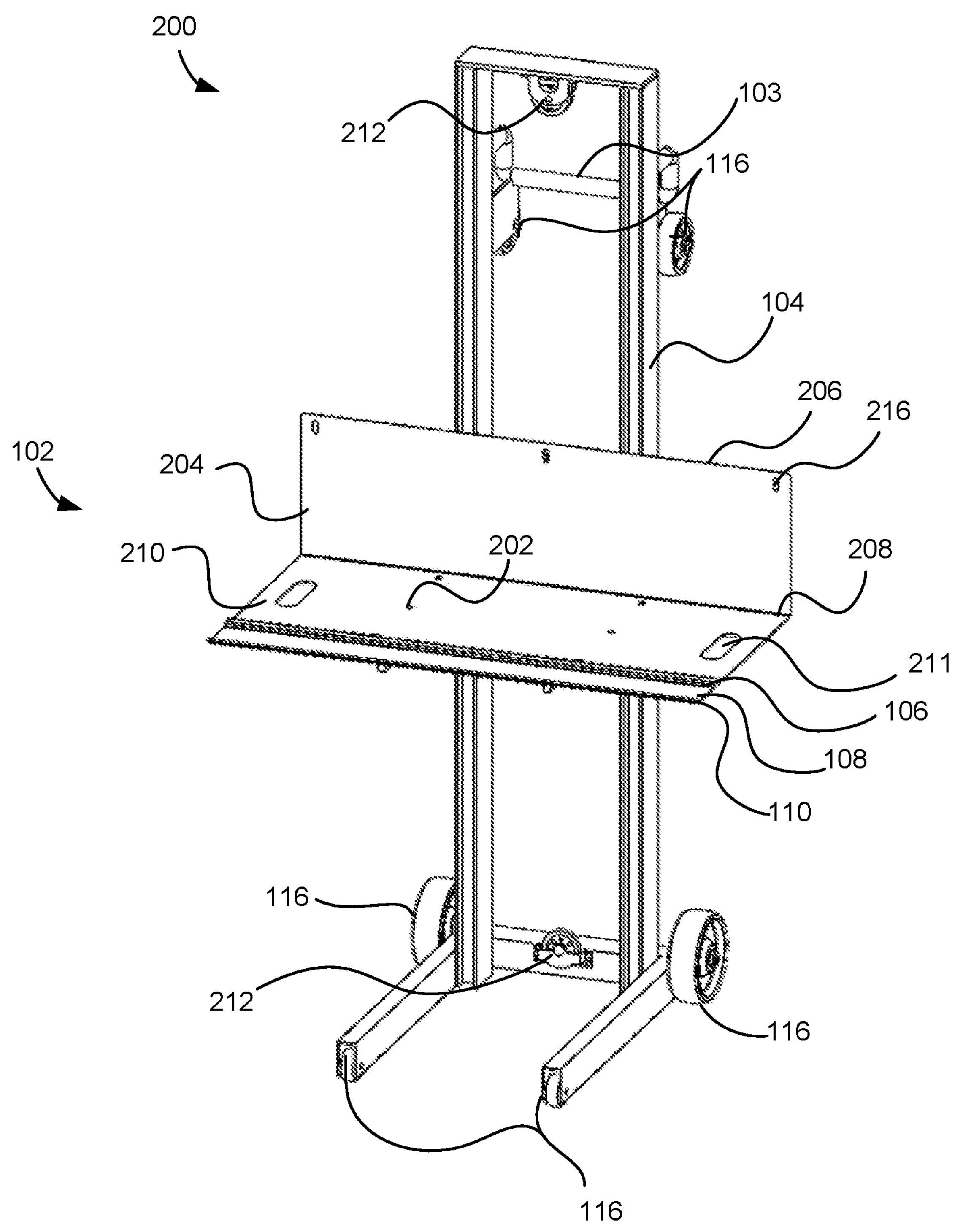
FIG. 3 illustrates a front isometric view of a support tray system including a support tray used with a load lift frame in an elevated position, in accordance with embodiments of the present disclosure.

FIG. 3 illustrates a front isometric view of a support tray system including a support tray used with a load lift frame in an elevated position. The description of the system 100 described with respect to FIGS. 1-2 is relevant to the present description of support tray system 200. Accordingly, similar components are referred to using similar numbering and include similar form and function unless otherwise noted herein. In this view, the support tray 102 is lifted to an elevated position, for example, to a mounting position. The lifting mechanism 112 including the pulleys 212 and the hand crank 214 may be used to vertically lift and lower the support tray 102. As shown, the support tray 102 has been lifted to relatively higher position and the wheels 116 and the handle of the load lift frame 104 may be used to translate the load lift frame 104 at least forward and backward relative to a mounting surface to position an article in a mounting position. For example, a single operator may use a handle 103 to pull the system 200 toward them and onto one or more wheels 116 for pushing the system 200 into position or pulling the system 200 into position, as would be appreciated by one having ordinary skill in the art.

Figure 4:
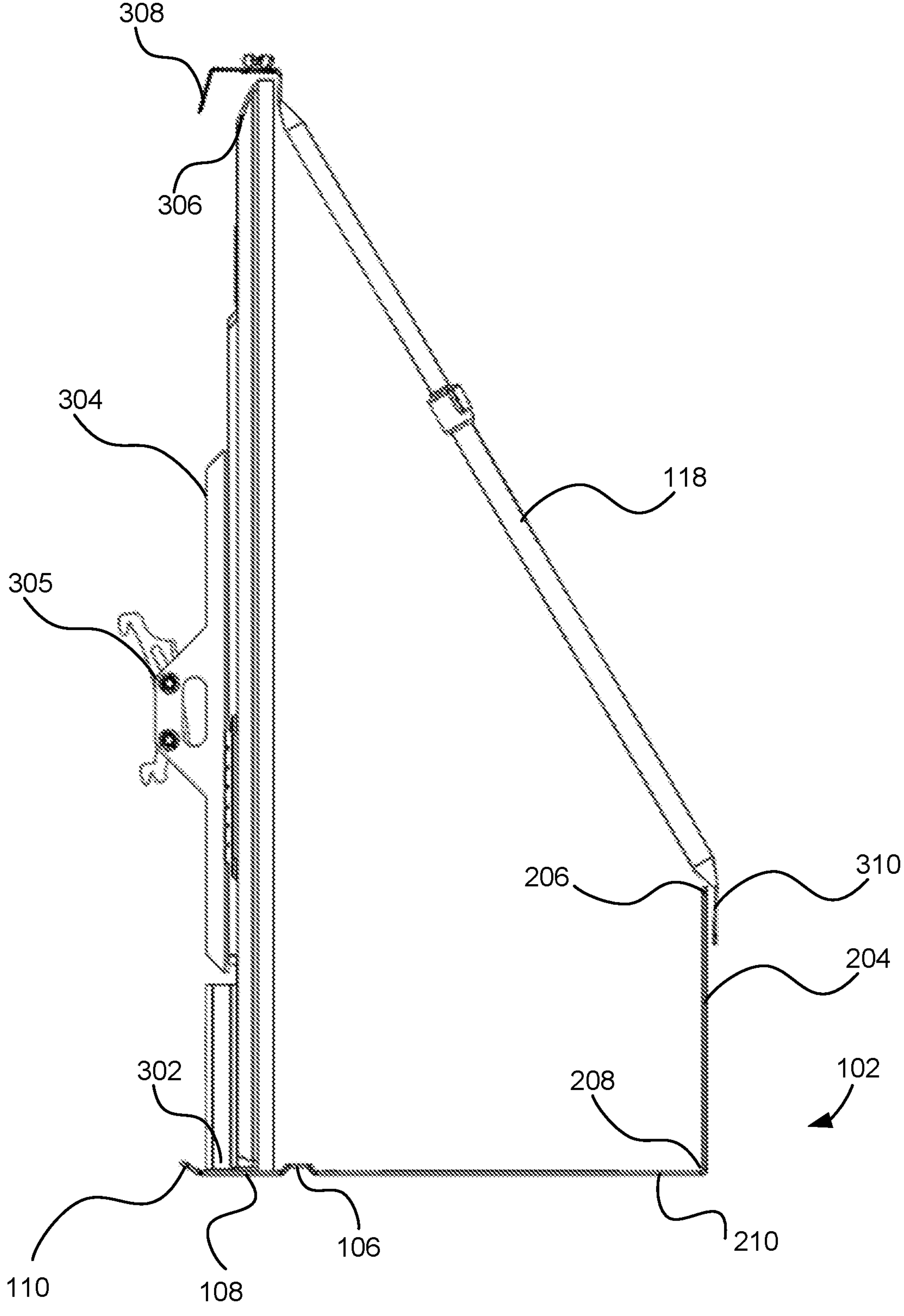
FIG. 4 illustrates a side view of a support tray having an article mounted thereon, in accordance with embodiments of the present disclosure.

FIG. 4 illustrates a side view of a support tray having an article mounted thereon. The description of the system 100 and system 200 described with respect to FIGS. 1-3 is relevant to the present description of support tray having an article mounted thereon. Accordingly, similar components are referred to using similar numbering and include similar form and function unless otherwise noted herein. Visible in this side view, the support tray 102 includes a horizontal portion 210 including the retaining feature 110, a groove 108, and a rib 106 as described in detail above. The horizontal portion 210 extends from the second edge 208 of the vertical portion 204. The groove 108 is sized and shaped to retain a bottom edge 302 of an article 304. The bottom edge 302 of the article 304 is restricted from sliding by the retaining feature 110 defining one side of the groove 108 with the rib 106 defining the other side of the groove 108. The top edge 306 of the article 304 is secured by a first end 308 of one or more extenders 118. The second end 310 of the one or more extenders 118 is removably coupled to the vertical portion 204 of the support tray 102. For example, various nuts and bolts may be inserted through an aperture in each of the extenders and a corresponding aperture (such as apertures 216, not shown) in the vertical portion 204. In various embodiments, the extenders 118 are telescoping extenders that are adaptable to reach the height of the article 304. The first end 308 of the extenders 118 may include padding or the like for protecting a screen or paint of the article 304. The first end 308 may further tighten around the top edge 306 of the article 304.

In various embodiments, the support tray 102 and the extenders 118 secure the article 304 in a perpendicular position relative to the horizontal portion 210 of the support tray 102 for aligning the article 304 against a mounting surface such as a wall or the like. Importantly, the retaining feature 110 and the rib 106 together maintain the article 304 in an upright position without sliding along the horizontal portion 210 toward or away from the vertical portion 204.

In at least some embodiments, the support tray 102 may include a hinge (not shown) between the vertical portion 204 and the horizontal portion 210 for rotating the vertical portion 204 relative to the vertical portion 204. Accordingly, the support tray 102 may be folded for transportation and storage.

Further visible in this view, the article 304 may have a mounting mechanism 305 integrally formed as part of the article 304 or coupled to the mounting mechanism 305. For example, the article 304 may be a television having a mounting bracket coupled thereto that further couples to a corresponding mounting bracket installed on the mounting surface. In other embodiments, the mounting mechanism 305 may be a wall mount, a wire extending across the article to be hung on a nail or the like, hooks, or any combination thereof.

Figure 5:
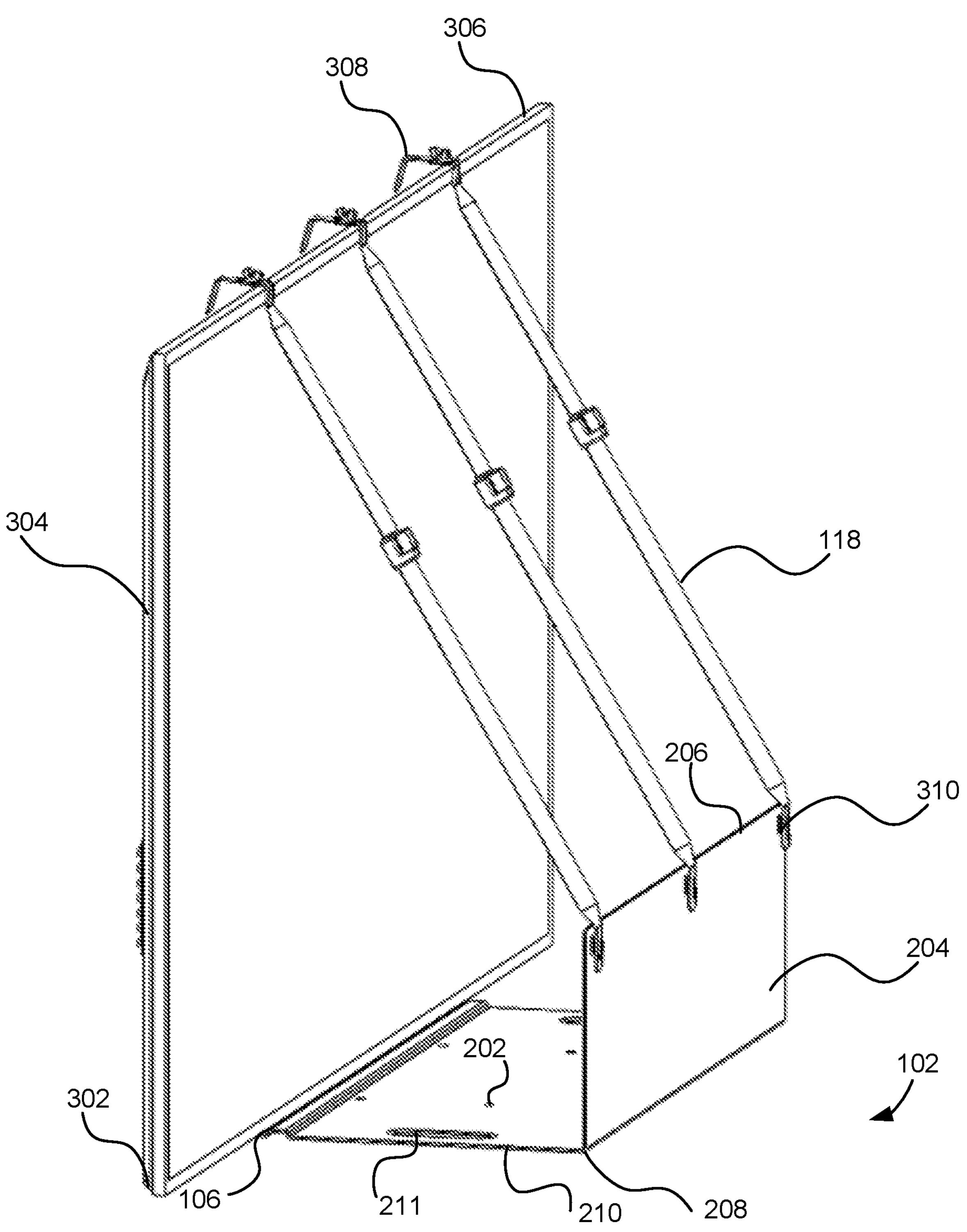
FIG. 5 is a rear isometric view of a support tray having an article mounted thereon, in accordance with embodiments of the present disclosure.

FIG. 5 is a rear isometric view of a support tray having an article mounted thereon. The description of the system 100 and system 200 described with respect to FIGS. 1-4 is relevant to the present description of support tray having an article mounted thereon. Accordingly, similar components are referred to using similar numbering and include similar form and function unless otherwise noted herein. Visible in this view, three extenders 118 are shown securing an article 304 to the support tray 102. Each of the extenders 118 includes a first end 308 that engages with and secures to the top edge 306 of the article 304. Further, each of the extenders 118 includes a second end 310 that engages with and secures the first edge 206 of the vertical portion 204.

Figure 6:
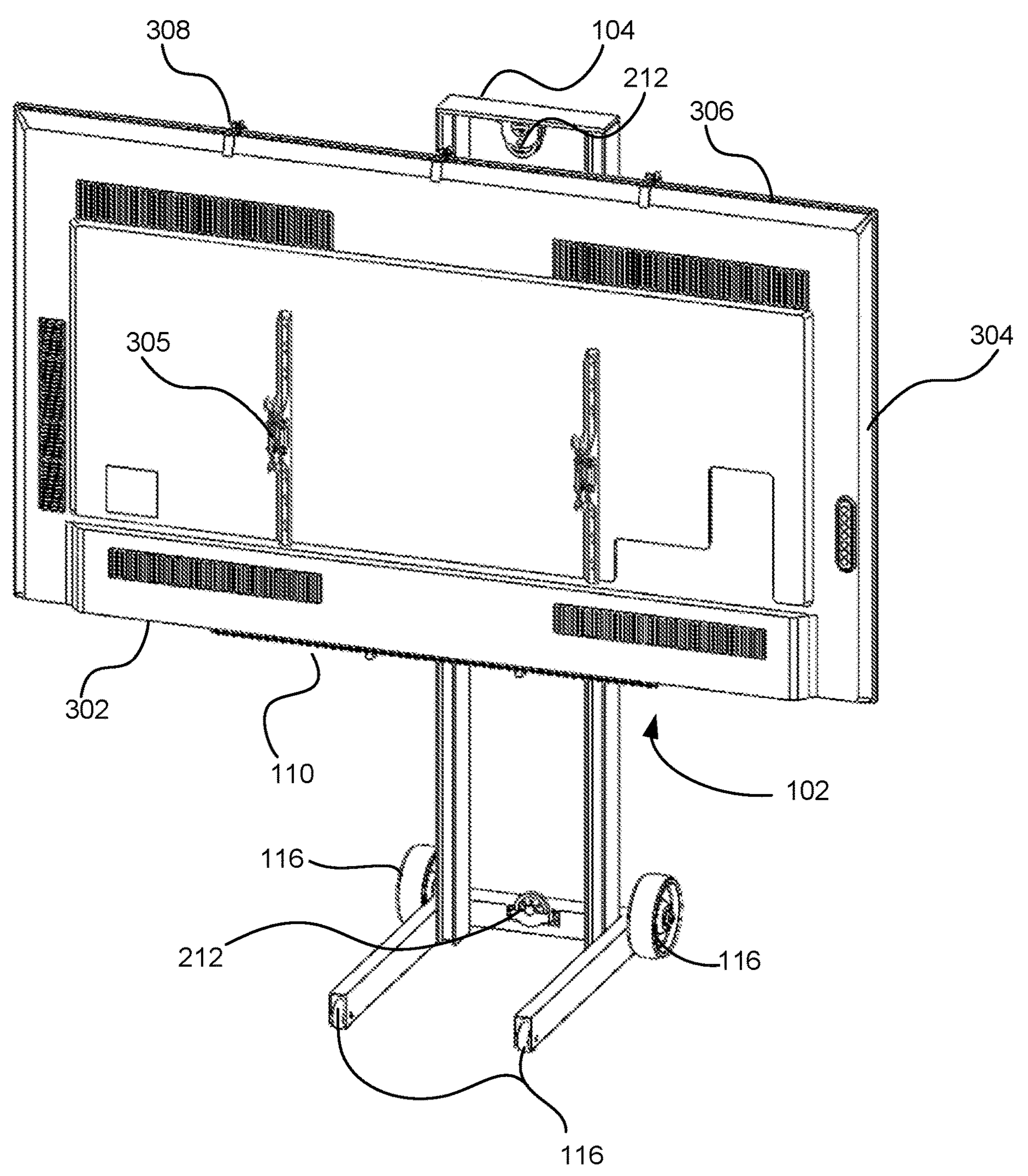
FIG. 6 illustrates a front isometric view of a support tray system including a support tray used with a load lift frame in an elevated position having an article mounted thereon, in accordance with embodiments of the present disclosure.

FIG. 6 illustrates a front isometric view of a support tray system including a support tray used with a load lift frame in an elevated position having an article mounted thereon. The description of the system 100 and system 200 described with respect to FIGS. 1-5 is relevant to the present description of support tray having an article mounted thereon. Accordingly, similar components are referred to using similar numbering and include similar form and function unless otherwise noted herein. Visible in this view, the article 304 is mounted to the support tray 102 and secured by the first end 308 of each extender (such as extenders 118, not shown) and the retaining feature 110 of the support tray 102. The article 304 is in an elevated position to align with a mounting position on a mounting surface.

Figure 7:
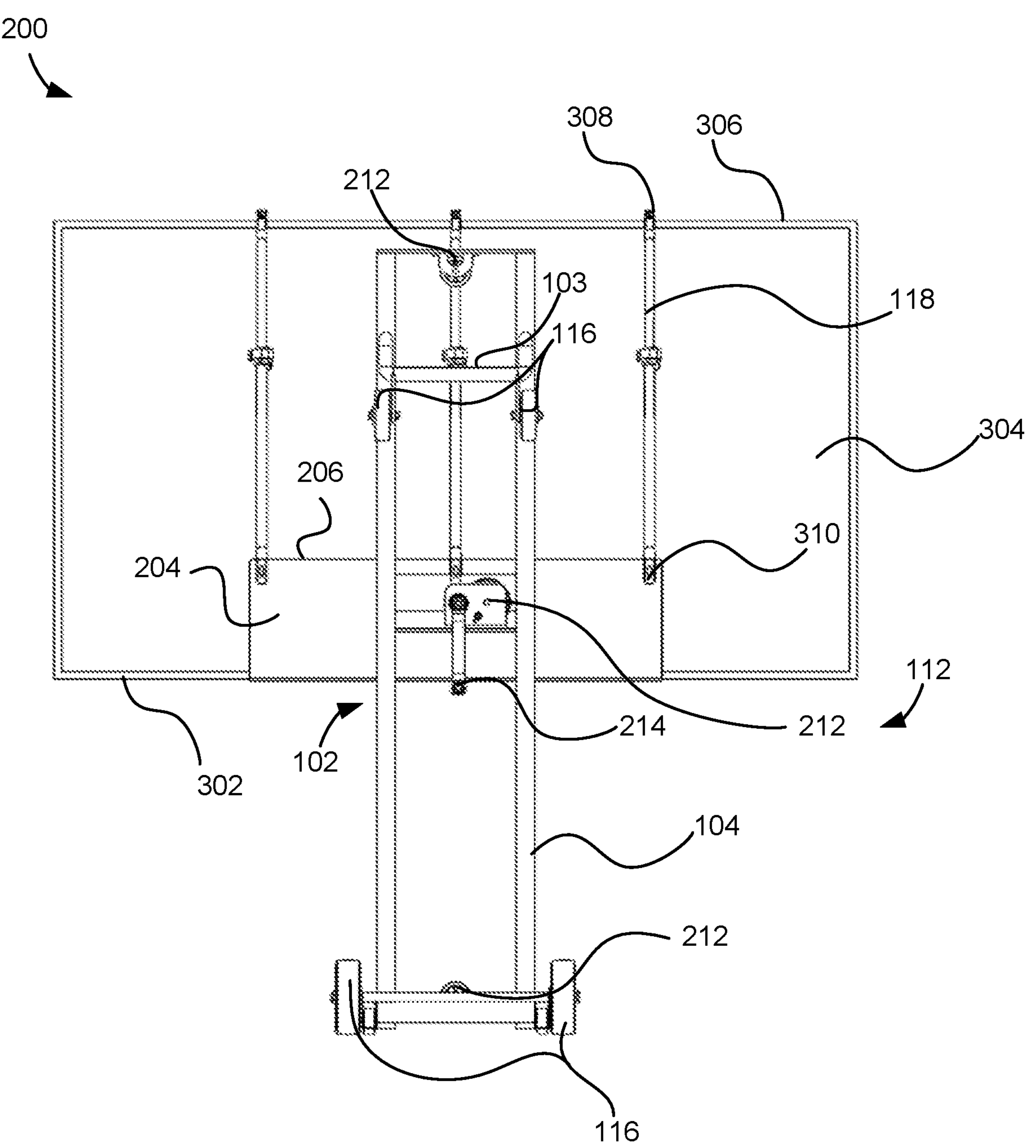
FIG. 7 is a rear view of a support tray system including a support tray used with a load lift frame in an elevated position having an article mounted thereon, in accordance with embodiments of the present disclosure.

FIG. 7 is a rear view of a support tray system including a support tray used with a load lift frame in an elevated position having an article mounted thereon. The description of the system 100 and system 200 described with respect to FIGS. 1-6 is relevant to the present description of support tray system. Accordingly, similar components are referred to using similar numbering and include similar form and function unless otherwise noted herein. Visible in this view, the article 304 is mounted to the support tray 102 and secured by the first end 308 of the extenders 118 and the second end 310 of the extenders 118. The article 304 is in an elevated position to align with a mounting position on a mounting surface. In this view, the support tray 102 is lifted to an elevated position, for example, to the mounting position. The lifting mechanism 112 including the pulleys 212 and the hand crank 214 are be used to vertically lift and lower the support tray 102. In this view, the wiring of the pulleys 212 is removed for clarity. In at least some embodiments, the lifting mechanism 112 may be locked in position at a desired height, for example, at a mounting height. As shown, the support tray 102 has been lifted to relatively higher position and the wheels 116 of the load lift frame 104 may be used to translate the load lift frame 104 at least forward and backward relative to a mounting surface to position the article 304 in a mounting position.

Figure 8:
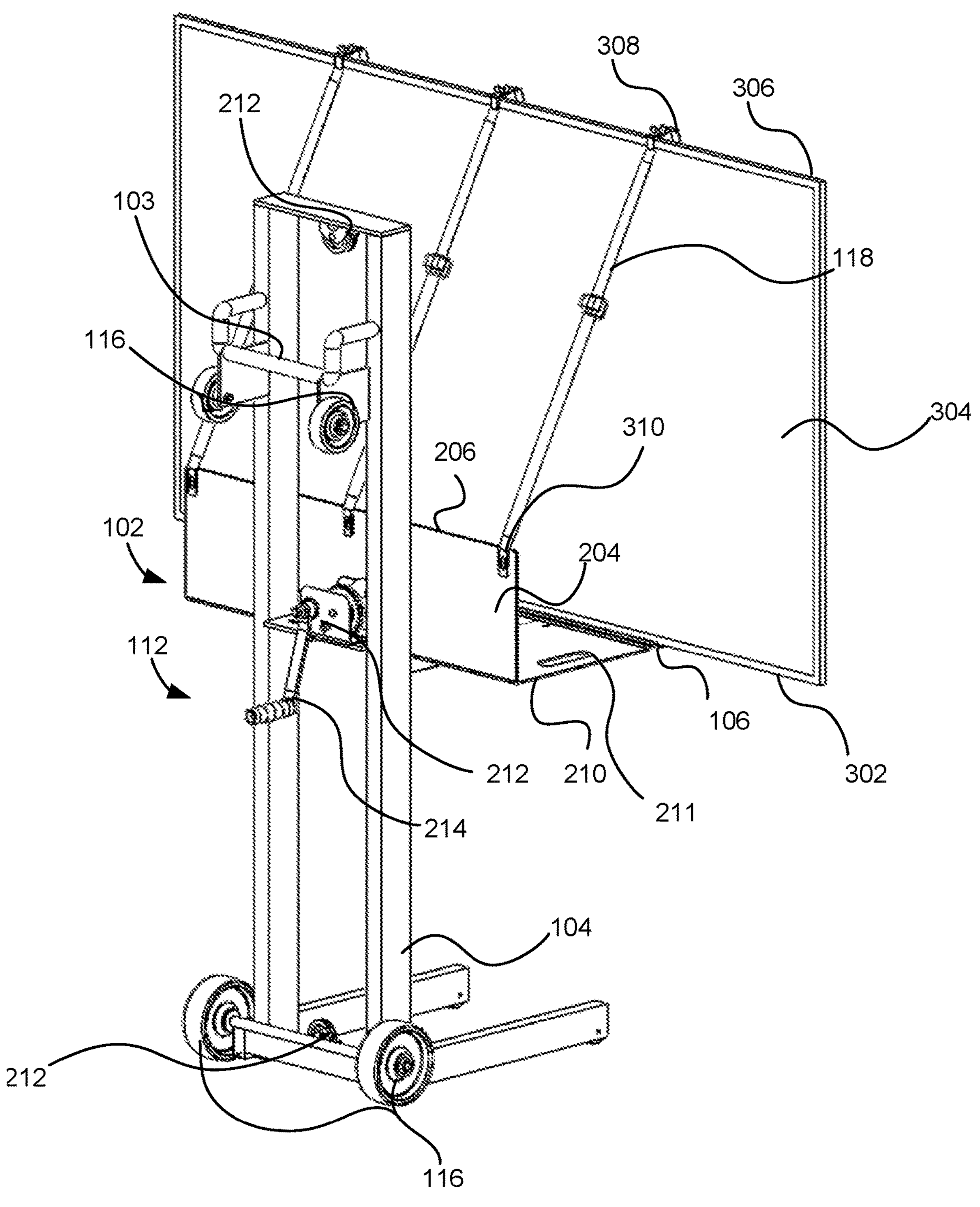
FIG. 8 is a rear isometric view of a support tray system including a support tray used with a load lift frame in an elevated position having an article mounted thereon, in accordance with embodiments of the present disclosure.

FIG. 8 is a rear isometric view of a support tray system including a support tray used with a load lift frame in an elevated position having an article mounted thereon. The description of the system 100 and system 200 described with respect to FIGS. 1-7 is relevant to the present description of support tray system. Accordingly, similar components are referred to using similar numbering and include similar form and function unless otherwise noted herein. Similarly visible in this view, the article 304 is mounted to the support tray 102 and secured by the first end 308 of the extenders 118 and the second end 310 of the extenders 118.

Figure 9:
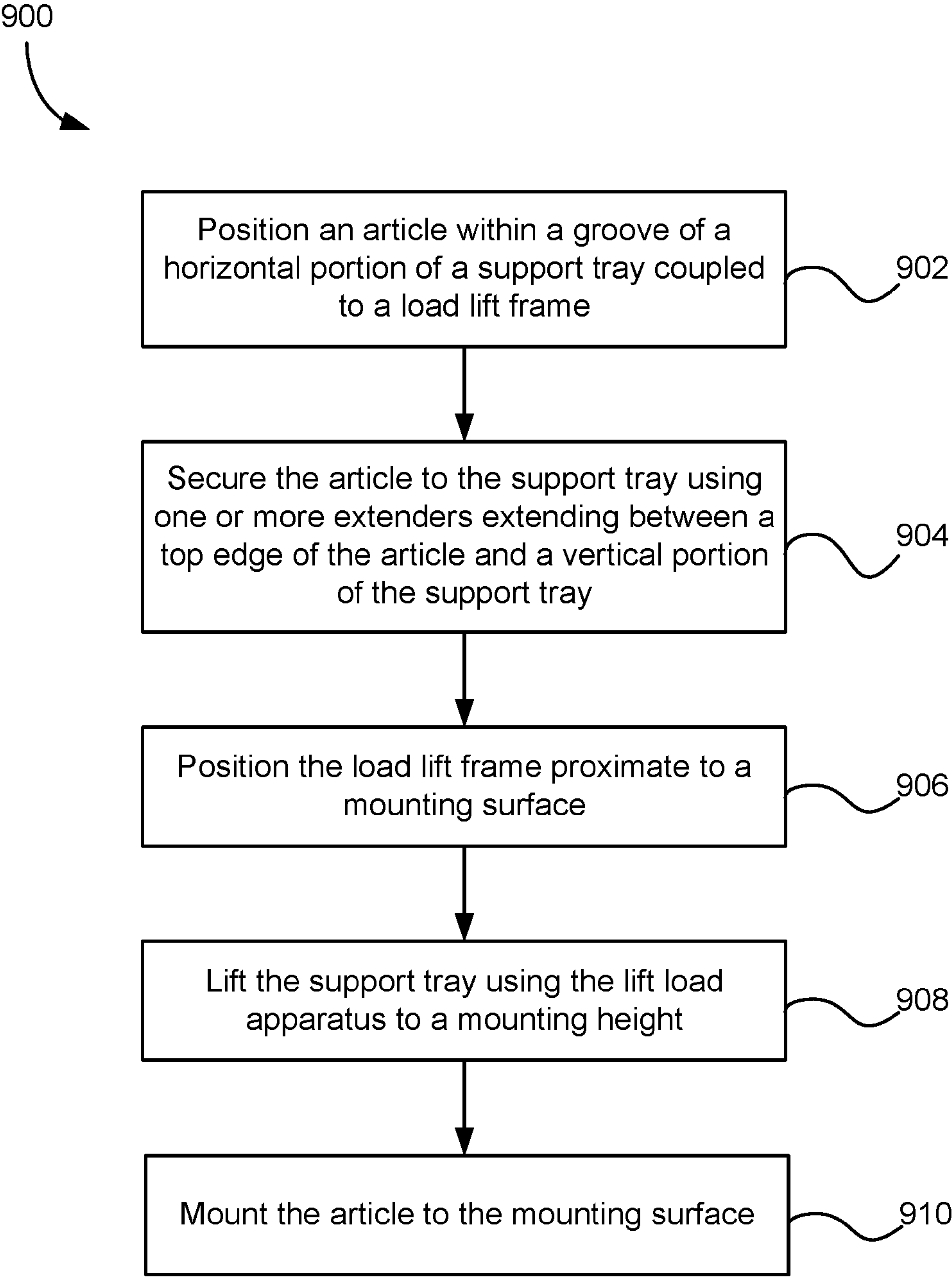
FIG. 9 is a flowchart of a method, in accordance with embodiments of the present disclosure.

FIG. 9 is a flowchart of a method. The description of the system 100 and system 200 described with respect to FIGS. 1-8 is relevant to the present description of the flowchart of the method. Method 900 includes step 902. Step 902 includes positioning an article within a groove of a horizontal portion of a support tray coupled to a load lift frame. The article may have a top edge and a bottom edge, and the bottom edge may be positioned within the groove such that the article is upright position perpendicular to a horizontal portion of the support tray. At step 902 the support tray may be in a lowered position and coupled to the load lift frame. The support tray and the load lift frame may include any combination of embodiments described herein.

Method 900 further include step 904. Step 904 includes securing the article to the support tray using one or more extenders extending between a top edge of the article and a vertical portion of the support tray. In various embodiments, the lengths of the extenders may be adapted to accommodate articles having different heights. For example, the extenders may extend between a top edge of a 100 inch article and the vertical portion of the support tray. Accordingly, the support tray system may be used to mount articles less than or equal to 100 inches. Securing the article to the support tray may including locking the first end and/or the second end of the extenders in their respective positions such that the article does not tip from its upright position.

Step 906 includes positioning the load lift frame proximate to a mounting surface. In various embodiments, the load lift frame includes wheels or the like and may be moved relatively close to the mounting surface having the support tray and the article secured thereto. A mounting surface may include a wall or the like. An article may include a television, a painting, a picture, a mirror, or the like, that may be mounted to the mounting surface. The article may be less or equal to 200 lbs. in various embodiments. In exemplary embodiments, the article is less than or equal to 140 lbs. In further exemplary embodiments, the article is less than or equal to 120 lbs.

Step 908 includes lifting the support tray using the load lift apparatus to a mounting height. The mounting height may correspond to the mounting position on the mounting surface. In various embodiments, lifting the support tray using a hand crank and pulley system of the load lift apparatus. The load lift apparatus lifts the support tray and the article vertically to the mounting height as the support tray and the article are secured to the load lift apparatus according to various embodiments described herein. Positioning the load lift frame proximate to a mounting surface and lifting the support tray using the load lift apparatus to a mounting height may include locking the article to the support tray.

Step 910 includes mounting the article to the mounting surface. In various embodiments, additional components such as a mounting frame, nails, hangers, or the like may be used to mount the article to the mounting surface in a manner that would be appreciated by one having ordinary skill in the art upon reading the present disclosure. According to at least some embodiments, method 900 includes lower the support tray coupled to the load lift frame once the article is mounted to the mounting surface at the article's mounting position.

In at least some embodiments, the support tray includes a hinge between the vertical portion and the horizontal portion of the support tray for rotating the vertical portion relative to the horizontal portion. After mounting the article to the mounting surface, the support tray may be removed from the load lift frame and collapsed using a hinge.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A support tray system comprising:
- a load lift frame, wherein the load lift frame is attached with a plurality of wheels;
- a support tray comprising:
  - a vertical portion comprising a first edge and a second edge opposite of the first edge; and
  - a horizontal portion extending from the second edge of the vertical portion, the horizontal portion comprising:
  - a rib of folded material for stiffening the horizontal portion;
  - a groove having a first side and a second side, the groove being sized and shaped for supporting an article; and
  - a retaining feature opposite the vertical portion and defining the first side of the groove, wherein the rib defines the second side of the groove, wherein each of the rib, the groove, and the retaining feature extend in parallel across a length of the horizontal portion and are disposed at an edge of the horizontal portion opposite of the vertical portion,
  - wherein the horizontal portion is removably coupled to a lifting portion of the load lift frame; and
- one or more extenders extending at an angle between a top edge of the article and the first edge of the vertical portion such that the article is secured in perpendicular position relative to the horizontal portion for aligning the article against a mounting surface.

2. The support tray system of claim 1, wherein the load lift frame includes a lifting mechanism to vertically lift and lower the support tray.

3. The support tray system of claim 1, further comprising one or more handles disposed on the horizontal portion.

4. The support tray system of claim 1, further comprising a plurality of extenders extending from and spaced along the first edge of the vertical portion of the support tray, each of the plurality of extenders having a first end and a second end.

5. The support tray system of claim 4, further comprising one or more apertures defined by the vertical portion for securing the second end of each of the plurality of extenders.

6. The support tray system of claim 1, further comprising one or more apertures defined by the horizontal portion for securing the support tray to the load lift frame.

7. The support tray system of claim 1, further comprising a hinge between the vertical portion and the horizontal portion for rotating the vertical portion relative to the horizontal portion.

8. A support tray comprising:
- a vertical portion comprising a first edge and a second edge opposite of the first edge; and
- a horizontal portion extending from the second edge of the vertical portion, the horizontal portion comprising:
- a rib of folded material for stiffening the horizontal portion;
- a groove having a first side and a second side, the groove being sized and shaped for supporting an article;
- a retaining feature opposite the vertical portion and defining the first side of the groove, wherein the rib defines the second side of the groove, wherein each of the rib, the groove, and the retaining feature extend in parallel across a length of the horizontal portion and are disposed at an edge of the horizontal portion opposite the vertical portion;
- one or more extenders extending at an angle between a top edge of the article and the first edge of the vertical portion such that the article is secured in perpendicular position relative to the horizontal portion for aligning the article against a mounting surface; and
- one or more apertures defined by the horizontal portion for securing the support tray to a lifting portion of the load lift frame.

9. The support tray of claim 8, wherein the article is a television.

10. The support tray of claim 8, further comprising one or more handles disposed on the horizontal portion.

11. The support tray of claim 8, further comprising one or more extenders, each of the one or more extenders having a first end and a second end.

12. The support tray of claim 11, further comprising one or more apertures defined by the vertical portion for securing the second end of each of the one or more extenders.

13. The support tray of claim 8, further comprising a hinge between the vertical portion and the horizontal portion for rotating the vertical portion relative to the horizontal portion.

14. A method for lifting an article comprising:
- positioning a bottom edge of an article within a groove defined between a retaining feature and a rib formed within a horizontal portion of a support tray coupled to a load lift frame, wherein each of the rib, the groove, and the retaining feature extend in parallel across a length of the horizontal portion and are disposed at an edge of the horizontal portion opposite of a vertical portion;
- securing the article to the support tray using one or more extenders extending between a top edge of the article and a top edge of the vertical portion of the support tray extending from the horizontal portion at an opposite edge from the groove;
- positioning the retaining feature of the support tray proximate to a mounting surface such that a mounting mechanism of the article is proximate to the mounting surface;
- lifting the support tray using a load lift apparatus to a mounting height; and
- mounting the article to the mounting surface.

15. The method of claim 14, further comprising lowering the support tray coupled to the load lift frame.

16. The method of claim 14, wherein positioning the load lift frame proximate to a mounting surface and lifting the support tray using the load lift apparatus to a mounting height, includes locking the article to the support tray.

17. The method of claim 14, further comprising a hinge between the vertical portion and the horizontal portion of the support tray for rotating the vertical portion relative to the horizontal portion.

18. The method of claim 17, further comprising folding the support tray by rotating the vertical portion relative to the horizontal portion.

19. The method of claim 14, wherein the article is a television.

* * * * *